United States Patent [19]

Shiraishi

[11] Patent Number: 4,641,044

[45] Date of Patent: Feb. 3, 1987

[54] CLOCK GENERATOR WITH RESET AND INITIALIZATION CIRCUITRY

[75] Inventor: Hajime Shiraishi, Tokyo, Japan

[73] Assignee: Kabushiki Kaisha Toshiba, Kawasaki, Japan

[21] Appl. No.: 676,318

[22] Filed: Nov. 29, 1984

[30] Foreign Application Priority Data

Jan. 25, 1984 [JP] Japan .................................. 59-11164

[51] Int. Cl.$^4$ ............................................ H03K 3/017
[52] U.S. Cl. .................................... 307/269; 307/480;
 307/529; 307/265; 307/443; 328/63
[58] Field of Search ................... 307/200 A, 443, 479,
 307/480, 247 R, 265, 269, 593, 608, 529;
 328/55, 58, 63, 73, 75, 111, 136, 30

[56] References Cited

U.S. PATENT DOCUMENTS 3,997,800 12/1976 Bain ............................ 307/247 R X
4,241,418 12/1980 Stanley .......................... 307/265 X
4,309,662 1/1982 Baudoux ....................... 307/269 X
4,329,652 5/1982 Higa et al. ..................... 307/269 X
4,398,155 8/1983 Atwell, Jr. et al. ............ 307/480 X
4,419,629 12/1983 O'Brien ........................ 307/269 X
4,560,939 12/1985 DeKarske et al. ............... 328/55 X

OTHER PUBLICATIONS

Intel iAPC 86, 88 User's Manual, pp. A-18 to A-20.

Primary Examiner—Stanley D. Miller
Assistant Examiner—D. R. Hudspeth
Attorney, Agent, or Firm—Finnegan, Henderson, Farabow, Garrett & Dunner

[57] ABSTRACT

After detecting a leading edge of a stop control signal supplied from an external circuit, an oscillation output signal is cut off at an input side of a frequency divider in synchronism with the first leading edge of a clock signal generated from the frequency divider, thereby stopping the generation of clock signals. The stopping of the clock signal generating operation is released in such a manner that, immediately after a trailing edge of an external control signal is detected, an internal state of the frequency divider is initialized, and the oscillation output signal which has been cut off is supplied to the frequency divider again, thereby generating a proper clock signal.

6 Claims, 8 Drawing Figures

F I G. 4
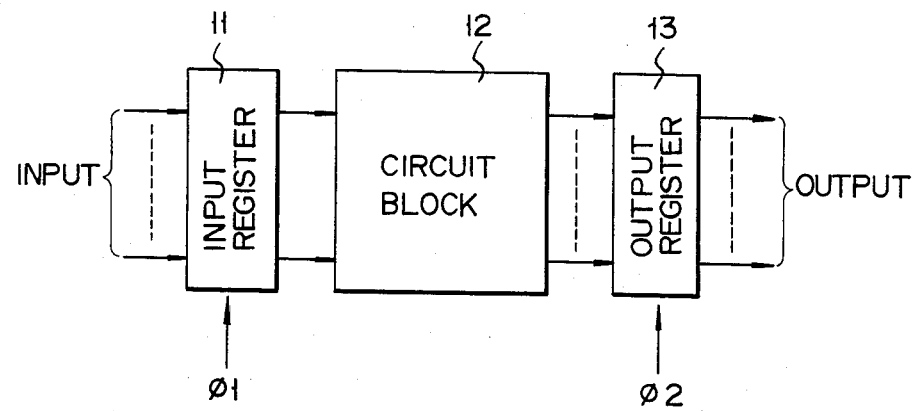
F I G. 5
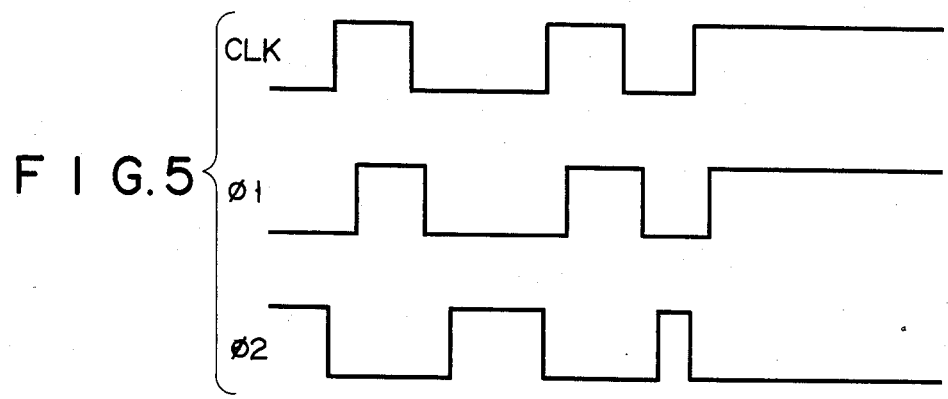

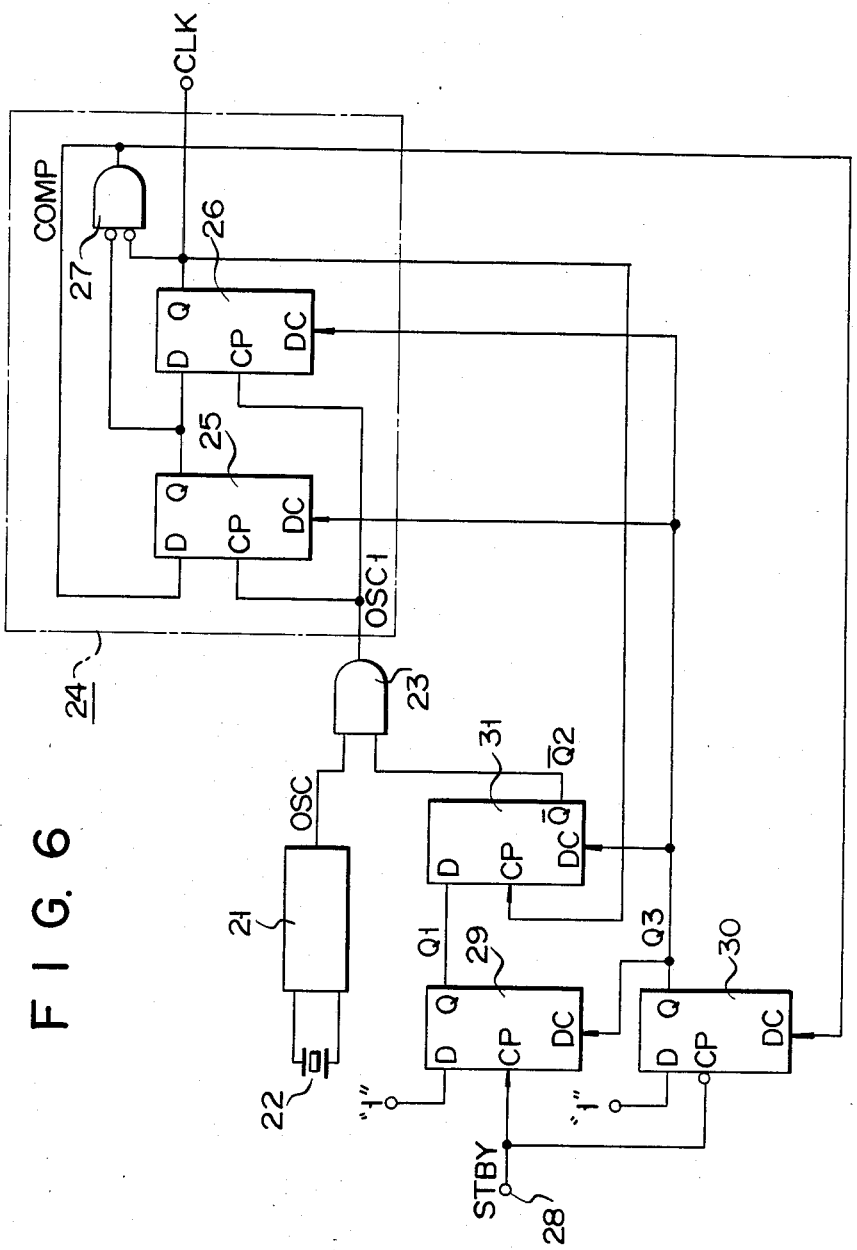
F I G. 6

CLOCK GENERATOR WITH RESET AND INITIALIZATION CIRCUITRY

BACKGROUND OF THE INVENTION

The present invention relates to a clock generator used in a microprocessor or the like and, more particularly, to a clock generator which controls the generation of clock signals in accordance with an external control signal.

FIG. 1 shows the configuration of the conventional clock generator used in a microprocessor. This clock generator comprises an oscillator 1, a frequency divider 2, and a synchronizing control circuit 3. The oscillator 1 oscillates at a predetermined period in correspondence with the natural frequency of a quartz vibrator 4. The frequency divider 2 divides an oscillation output signal OSC from the oscillator 1, thereby generating a clock signal CLK which controls a microprocessor. The synchronizing control circuit 3 synchronizes the clock signal CLK with an external synchronizing signal SYN which is supplied to an external synchronizing control terminal 5.

When the supply of the clock signal CLK to a CMOS microprocessor is stopped so as to set the CMOS microprocessor in the standby mode to reduce its power consumption by utilizing a conventional clock generator of this type, the cycle of the clock signal CLK generated immediately beforehand cannot be properly completed depending on the timing of the external synchronizing signal SYN, as shown in the timing chart of FIG. 2. In other words, during a period T of one cycle of the clock signal CLK, a period of "0" level must be ($\frac{2}{3}$)T and a period of "1" level must be ($\frac{1}{3}$)T. However, when the external synchronizing signal SYN used as a clock stop control signal goes to "1" level with the timing shown in FIG. 2, the clock signal CLK is also at "1" level at this time, thereby stopping generation of the clock signal CLK. In this case, in a cycle immediately before stopping the clock signal CLK, a period TO during which the clock signal is at the "0" level becomes shorter than ($\frac{2}{3}$)T, and a duty cycle of the clock signal CLK is thereby disturbed. This can cause the microprocessor which is controlled by the clock signal CLK to malfunction. The reason will be described hereinafter.

A microprocessor generally forms, e.g., two phase clock signals $\phi 1$ and $\phi 2$ as shown in FIG. 3 by using a clock signal supplied from a clock generator. The microprocessor controls various operations by using the two phase clock signals $\phi 1$ and $\phi 2$. For example, as shown in FIG. 4, an internal circuit of the microprocessor comprises an input register 11, a circuit block 12 having a single function, and an output register 13. In this circuit, when one clock signal $\phi 1$ is at "1" level, input data or an input signal is written in the input register 11, and when the signal $\phi 1$ is at "0" level, this writing operation is stopped. When the other signal $\phi 2$ is at "1" level, a calculation or determination of a control signal by the circuit block 12 is performed in accordance with the data or signal written in the input register 11. In addition, during this period, output data or a signal from the circuit block 12 is supplied to the output register 13, thereby ensuring a high-speed and precise operation.

However, as shown in FIG. 2, when the clock signal CLK is stopped at an incorrect timing of the two phase clock signals $\phi 1$ and $\phi 2$ which are formed in the microprocessor from the clock signal CLK, the signal $\phi 2$ (or $\phi 1$) has a considerably shorter pulse width than normal, as shown in the timing chart of FIG. 5. Therefore, the predetermined operation of the microprocessor cannot be provided, thereby causing a malfunction of the microprocessor.

SUMMARY OF THE INVENTION

It is an object of the present invention to provide a clock generator which can generate a proper clock signal free from disturbance in a duty cycle when the generation operation of the clock signal is stopped or restarted, and can avoid a malfunction of a microprocessor before and after the standby mode when the clock generator is used in a CMOS microprocessor having a standby function.

According to the present invention, there is provided a clock generator receiving a pulse signal having a predetermined period comprising a frequency-dividing means for generating a clock signal by frequency dividing the pulse signal, the frequency-dividing means including a divider clear terminal for receiving a clear signal to set the frequency dividing means into an initial state; a control terminal for receiving a control signal to stop the frequency dividing means from generating clock signals; first memory means having an input terminal coupled to the terminal for storing the control signal received at the control terminal and for providing a first memory output signal, the first memory means also having a first memory clear terminal for receiving the clear signal to set the first memory into an initial state; second memory means having an input terminal coupled to receive the first memory output signal for storing the first memory output signal of the first memory means in synchronism with the clock signal generator from the frequency-dividing means and for producing a second memory output signal, the second memory means also having a second memory clear terminal for receiving the clear signal to set the second memory means into an initial state; controlling means coupled to receive the pulse signal and the second memory output signal for supplying the pulse signal to the frequency-dividing means in accordance with the second memory output signal of the second memory means; and third memory means having an input terminal coupled to the control terminal for storing a level of the control signal supplied to the control terminal, for restarting the frequency-dividing operation of the frequency-dividing means, and for supplying the clear signals to the first and second memory means and the frequency-dividing means.

BRIEF DESCRIPTION OF THE DRAWINGS

FIG. 4 is a circuit diagram showing an internal circuit of a microprocessor;

FIG. 5 is a timing chart showing a clock signal which can cause a malfunction of a general purpose microprocessor;

FIG. 6 is a circuit diagram showing a configuration of a clock generator according to an embodiment of the present invention.

DETAILED DESCRIPTION OF THE PREFERRED EMBODIMENT

Figure 1:
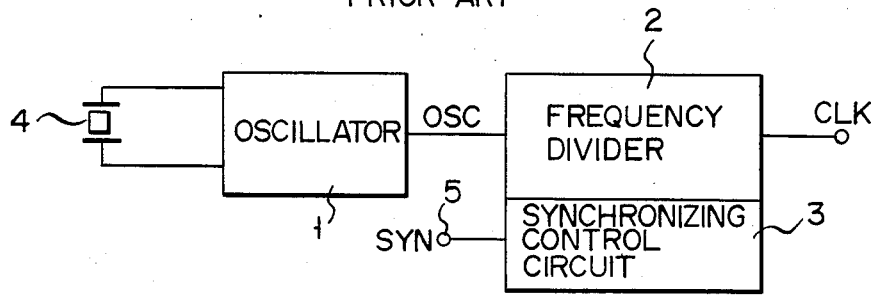
FIG. 1 is a block diagram of a conventional clock generator.
Figure 2:
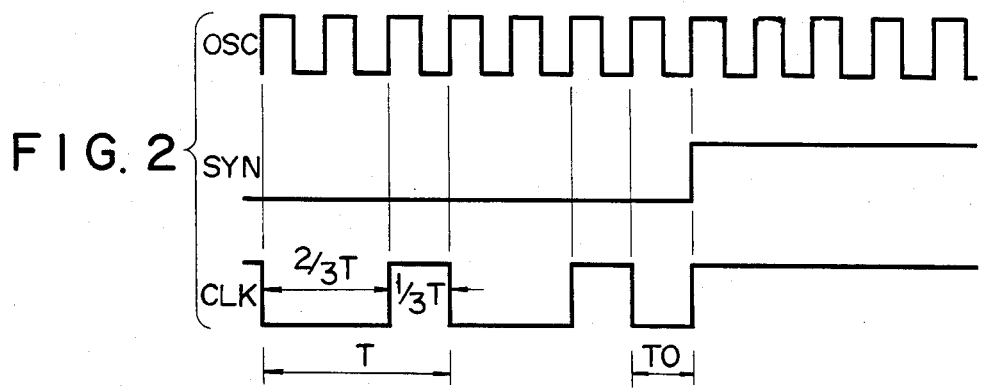
FIG. 2 is a timing chart showing the operation of the conventional clock generator.
Figure 3:
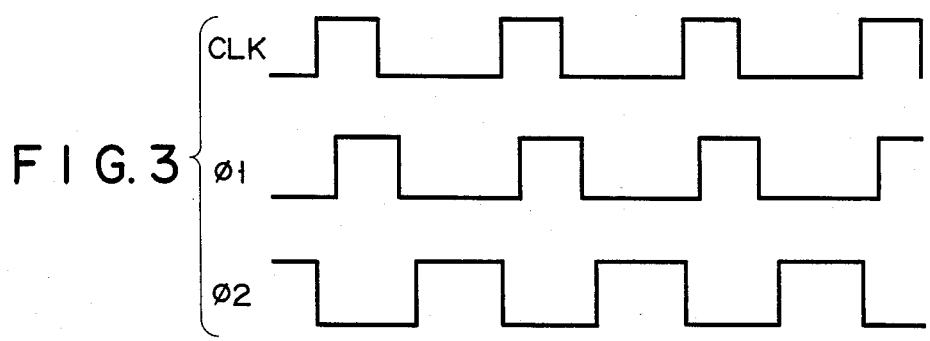
FIG. 3 is a timing chart showing a clock signal generally used in a microprocessor.

An embodiment of the present invention will be described with reference to the accompanying drawings hereinafter.

FIG. 6 is a circuit diagram showing a configuration of a clock generator according to the present invention. Reference numeral 21 denotes an oscillator to which a quartz vibrator 22 is externally connected and which oscillates at a predetermined period. An oscillation output signal OSC obtained from the oscillator 21 is supplied to one input terminal of a two-input AND gate 23. The AND gate 23 generates an oscillation output signal OSC1 in correspondence with a control signal which is supplied to the other input terminal thereof. The output signal OSC1 is supplied to a frequency divider 24. The frequency divider 24 generates a clock signal CLK frequency-dividing the output signal OSC1 by one-third. The frequency divider 24 comprises two D-type flip-flops 25 and 26, and a two-inverting input AND gate 27. The above signal OSC1 is supplied to the flip-flops 25 and 26 as a synchronizing signal CP in parallel.

In addition to this, the flip-flops 25 and 26 are connected to each other in series so that the Q output signal of the former stage serves as an input signal of the latter stage. The Q output signal of the latter stage flip-flop 26 is supplied to a CMOS microprocessor (not shown) as the clock signal CLK. Furthermore, the Q output signals of the flip-flops 25 and 26 are supplied to the AND gate 27 in parallel. The AND gate 27 detects the cleared state of the flip-flops 25 and 26 wherein these flip-flops are reset, and the Q output signals thereof are at "0" level. An output signal COMP of the AND gate 27 is fed back to the former stage flip-flop 25 as an input signal. In other words, the two flip-flops 25 and 26 constitute a ⅓ frequency divider of the signal OSC1 together with the AND gate 27 for detecting a cleared state.

Reference numeral 28 denotes a control terminal to which a control signal STBY for controlling the frequency-dividing operation of the frequency divider 24 is externally supplied. The control signal STBY which is supplied to the control terminal 28 is supplied to two D-type flip-flops 29 and 30 as a synchronizing signal CP. A signal having "1" level is always supplied to the flip-flop 29 as an input signal. The flip-flop 29 stores "1" level data in synchronism with a leading edge of the control signal STBY supplied as the synchronizing signal.

The Q output signal Q1 of the flip-flop 29 is supplied to another D-type flip-flop 31 as an input signal. The clock signal CLK generated from the frequency divider 24 is supplied to the flip-flop 31 as the synchronizing signal CP. The flip-flop 31 stores the Q output signal Q1 from the flip-flop 29 as an input signal in synchronism with the leading edge of the signal CLK. The $\overline{Q}$ output signal Q2 from the flip-flop 31 is supplied to the other input terminal of the AND gate 23 as the control signal described above.

A signal having "1" level is always supplied to the flip-flop 30 as an input signal. The flip-flop 30 stores "1" level data in synchronism with the trailing edge of the control signal STBY supplied as the synchronizing signal. The Q output signal Q3 of the flip-flop 30 is respectively supplied to the flip-flops 25, 26, 29 and 31 as a direct clear signal in parallel. The signal COMP obtained as the output signal of the AND gate 27 is supplied to the flip-flop 30 as a direct clear signal.

The operation of the circuit of this embodiment will be described with reference to the timing charts of FIGS. 7 and 8. The control signal STBY is kept at "0" level. In this case, all the flip-flops are in the cleared state. In the cleared state, the $\overline{Q}$ output signal Q2 from the flip-flop 31 is kept at "1" level, and the AND gate 23 is enabled by this signal Q2. For this reason, the oscillation output signal OSC from the oscillator 21 passes through this AND gate 23 and is supplied to the frequency divider 24 as the signal OSC1. When the signal OSC1 is supplied to the frequency divider 24, the frequency divider 24 frequency divides this signal, thereby sequentially generating the clock signal CLK of, for example, ⅓ duty, as shown in FIG. 7.

Then, assume that the control signal STBY rises from "0" level to "1" level at any timing. The flip-flop 29 stores "1" level data in synchronism with the leading edge of the signal STBY, and the Q output signal Q1 thereof is at "1" level. In other words, the flip-flop 29 stores the state wherein the control signal STBY is at "1" level. Thereafter, when one cycle of the clock signal CLK generated from the frequency divider 24 ends and the signal CLK goes to "1" level, the flip-flop 31 stores the Q output signal Q1 of the flip-flop 29 in synchronism with the leading edge of the signal CLK.

Figure 7:
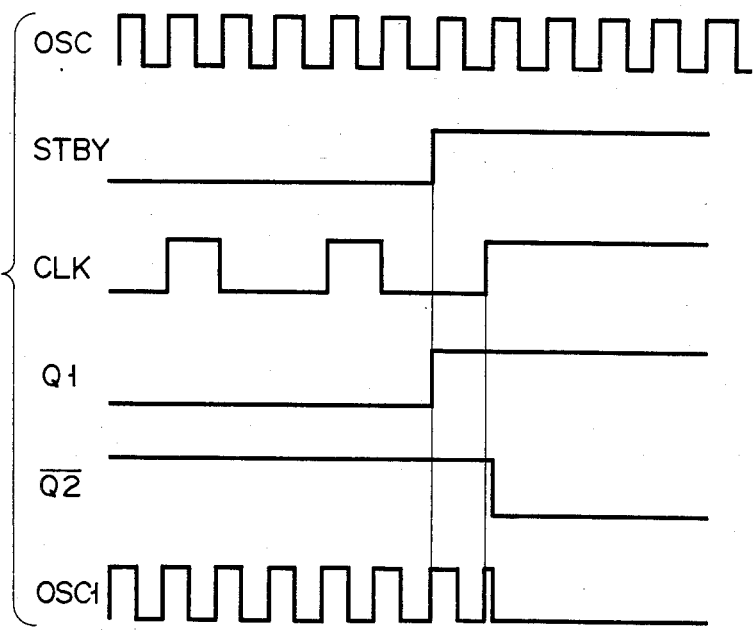
FIGS. 7 and 8 are respectively timing charts for explaining the operation of the circuit according to the embodiment.

Since the signal Q1 is preset at "1" level, the flip-flop 31 stores "1" level data in synchronism with the leading edge of the signal CLK, and the $\overline{Q}$ output signal Q2 hereof is at "0" level, as shown in FIG. 7. When the signal Q2 is at "0" level, the AND gate 23 is disabled. Therefore, the oscillation output signal OSC cannot thereafter pass through the AND gate 23, and the signal OSC1 is kept at "0" level. For this reason, the flip-flops 25 and 26 store the state before the AND gate 23 is disabled. The clock signal CLK, as the output signal of the frequency divider 24, is stopped at a proper timing when one cycle ends. When the microprocessor generates two phase clock signals $\phi 1$ and $\phi 2$ from the clock signal CLK, the signals $\phi 1$ and $\phi 2$ are stopped at a proper timing. Therefore, the microprocessor can be switched into the standby mode at a proper timing. When the clock signal is stopped, a malfunction which occurs when a conventional clock generator is employed can be prevented.

Figure 8:
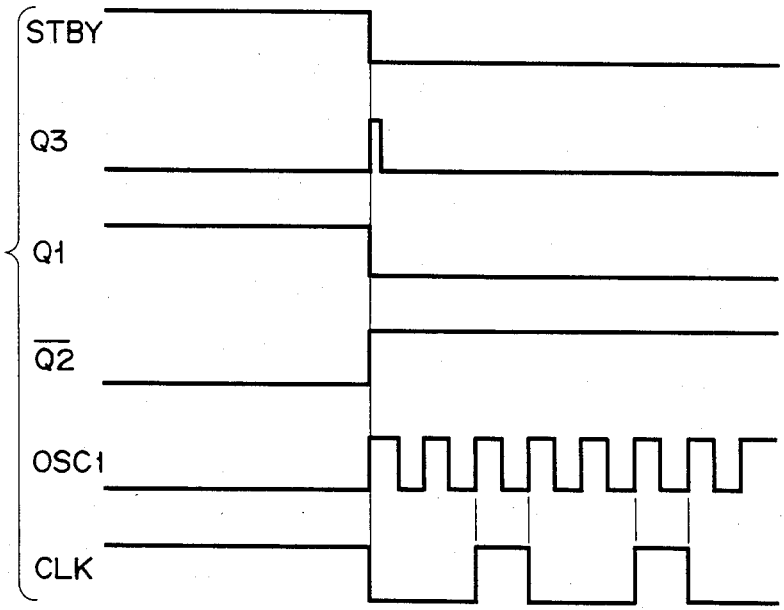

When generation of the clock signal CLK is restarted from the clock signal stop state, the control signal STBY is reset to "0" level at an arbitrary timing, as shown in FIG. 8. Then, since the flip-flop 30 stores "1" level data in synchronism with the trailing edge of the signal STBY, the Q output signal Q3 is set at "1" level, as shown in FIG. 8. When the signal Q3 is set at "1" level, the flip-flops 29 and 31 which use this signal Q3 as the direct clear signal are respectively cleared. Therefore, the Q output signal Q1 of the flip-flop 29 is set at "0" level and the $\overline{Q}$ output signal Q2 of the flip-flop 31 is set at "1" level. In addition, when the signal Q2 is set at "1" level, the AND gate 23 is enabled, thereby supplying the signal OSC1 to the frequency divider 24. When the flip-flops 29 and 31 are cleared, the flip-flops 25 and 26 in the frequency divider 24 are also cleared by the signal Q3. Then, both the Q output signals of the flip-flops 25 and 26 are set at "0" level, thereby setting the output signal COMP of the gate 27 at "1" level.

When the signal COMP is set at "1" level, the flip-flop 30 is cleared and the Q output signal Q3 thereof is set at "0" level. Then, the cleared state of the respective flip-flops 25, 26, 29 and 31 is released. The frequency divider 24 can sequentially frequency divide the output signal OSC1 at the proper timing. Since the clock signal CLK obtained from this frequency-dividing operation has the proper timing, the microprocessor can be switched from the standby mode to the normal mode at the proper timing.

Even when the standby mode is released, a malfunction of the microprocessor due to a timing shift of the clock signal CLK can be prevented.

In this manner, according to the above embodiment, when the clock signal generating operation is stopped and restarted, the clock signal CLK having the proper timing can be obtained. For this reason, when the standby function of a CMOS microprocessor is realized using the clock signal CLK obtained from the circuit of this embodiment, the proper operation of the microprocessor can be ensured without causing a malfunction thereof.

The present invention is not limited to the above embodiment, and various changes and modifications may be made within the spirit and scope of the present invention. For example, in the above embodiment, a frequency divider 24 of one-third the frequency-division type is used. However, any frequency division ratio can be adopted as needed.

What is claimed is:

1. A clock generator receiving a pulse signal having a predetermined period comprising:

frequency-dividing means for generating a clock signal by frequency dividing said pulse signal, said frequency-dividing means including a divider clear terminal for receiving a clear signal to set said frequency-dividing means into an initial state;

a control terminal for receiving a control signal to stop said frequency-dividing means from generating said clock signals;

first memory means, having an input terminal coupled to said control terminal, for storing a level of said control signal received at said control terminal and for providing a first memory output signal, said first memory means also having a first memory clear terminal for receiving said clear signal to set said first memory into an initial state;

second memory means, coupled to said first memory means, for storing said first memory output signal of said first memory means in synchronism with the clock signal generated from said frequency-dividing means and for producing a second memory output signal, said second memory means also having a second memory clear terminal for receiving said clear signal to set said second memory means into an initial state;

controlling means, coupled to receive said pulse signal and said second memory output signal, for supplying said pulse signal to said frequency-dividing means according to the state of said second memory output signal of said second memory means; and third memory means, having an input terminal coupled to said control terminal, for storing a level of said control signal supplied to said control terminal for restarting the frequency-dividing means in response to said control signal, and for supplying said clear signal to said first and second memory means and said frequency-dividing means.

2. A clock generator according to claim 1, wherein said third memory means includes a third memory clear terminal coupled to said frequency-dividing means to receive a reset signal whereby said third memory means is initialized according to said reset signal.

3. A clock generator according to claim 1, wherein said first memory means comprises a flip-flop coupled to receive a signal having a constant level at a data input terminal, and coupled to receive said control signal at a clock terminal.

4. A clock generator according to claim 1, wherein said second memory means comprises a flip-flop coupled to receive said clock signal generated from said frequency dividing means at a clock terminal, and coupled to receive said first memory output signal from said first memory means at a data input terminal.

5. A clock generator according to claim 1, wherein said frequency-dividing means comprises a plurality of flip-flops connected in series to frequency divide the pulse signal having the predetermined period, and a detecting gate coupled to said plurality of flip-flops for detecting states of said plurality of flip-flops.

6. A clock generator according to claim 1, wherein said third memory means comprises a flip-flop coupled to receive a signal having a constant level at a data input terminal, and coupled to receive said control signal at a clock terminal.

* * * * *